US012603404B2

(12) United States Patent　　(10) Patent No.:　US 12,603,404 B2

Katayama　　(45) Date of Patent:　Apr. 14, 2026

(54) BATTERY MODULE, METHOD FOR MANUFACTURING BATTERY MODULE, ELECTRONIC DEVICE, AND ELECTRIC VEHICLE

(71) Applicant: MURATA MANUFACTURING CO., LTD., Kyoto (JP)

(72) Inventor: Motoki Katayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 509 days.

(21) Appl. No.: 18/124,271

(22) Filed: Mar. 21, 2023

(65) Prior Publication Data

US 2023/0223667 A1　　Jul. 13, 2023

Related U.S. Application Data

(63) Continuation of application No. PCT/JP2021/043889, filed on Nov. 30, 2021.

(30) Foreign Application Priority Data

Dec. 15, 2020　(JP) ................................. 2020-207684

(51) Int. Cl.
　*H01M 50/581*　　(2021.01)
　*H01M 10/42*　　(2006.01)
　*H01M 50/519*　　(2021.01)

(52) U.S. Cl.
　CPC ....... *H01M 50/581* (2021.01); *H01M 10/425* (2013.01); *H01M 50/519* (2021.01); *H01M 2200/106* (2013.01); *H01M 2220/20* (2013.01)

(58) Field of Classification Search
　CPC .. H01M 50/581; H01M 50/519; H01M 10/42; H01M 10/425
　See application file for complete search history.

(56) References Cited

U.S. PATENT DOCUMENTS

| | | | |
|---|---|---|---|
| 2004/0170887 A1* | 9/2004 | Masumoto | .......... H01M 50/593 |
| | | | 429/185 |
| 2014/0178715 A1* | 6/2014 | Koh | .................... H01M 50/553 |
| | | | 429/7 |
| 2020/0106125 A1 | 4/2020 | Yano et al. | |

FOREIGN PATENT DOCUMENTS

| | | |
|---|---|---|
| JP | 2002142357 A | 5/2002 |
| JP | 2009183141 A | 8/2009 |

(Continued)

OTHER PUBLICATIONS

International Search Report of corresponding PCT application PCT/JP2021/043889, dated Jan. 25, 2022.

(Continued)

*Primary Examiner* — Karie O'neill Apicella

(74) *Attorney, Agent, or Firm* — K&L Gates LLP

(57)　　　ABSTRACT

A battery module includes: an all-solid-state battery having a voltage exceeding 0 V; a semiconductor element; a PTC element; and a circuit board, wherein the all-solid-state battery, the semiconductor element, and the PTC element are solder-bonded to the circuit board, the all-solid-state battery has a positive electrode terminal and a negative electrode terminal, the semiconductor element is electrically connected between the positive electrode terminal and the negative electrode terminal, and the PTC element is connected in series between the positive electrode terminal or the negative electrode terminal and the semiconductor element.

8 Claims, 8 Drawing Sheets

(56)     References Cited

FOREIGN PATENT DOCUMENTS

| JP | 2014123553 A | 7/2014 |
| WO | 2018181288 A1 | 10/2018 |

OTHER PUBLICATIONS

Office Action issued in related Japanese Patent Application No. 2022-569837, dated Mar. 14, 2023. (2 pages.).

* cited by examiner

WEARABLE TERMINAL
630

632

BATTERY MODULE, METHOD FOR MANUFACTURING BATTERY MODULE, ELECTRONIC DEVICE, AND ELECTRIC VEHICLE

CROSS REFERENCE TO RELATED APPLICATIONS

The present application is a continuation of PCT patent application no. PCT/JP2021/043889, filed on Nov. 30, 2021, which claims priority to Japanese patent application no. JP2020-207684, filed on Dec. 15, 2020, the entire contents of which are incorporated herein by reference.

BACKGROUND

The present application relates to a battery module, a method for manufacturing the battery module, an electronic device, and an electric vehicle.

In recent years, research and development on all-solid-state batteries have been actively conducted. All-solid-state batteries can be easily packed in that all-solid-state batteries have high heat resistance and can be directly mounted on a circuit board by reflow or the like. In addition, all-solid-state batteries include a space required at the time of incorporation into a main body that is smaller than that of a typical lithium ion battery.

However, when an all-solid-state battery is mounted by reflow together with other electronic components in a state in which the all-solid-state battery has a potential, a current flows from the all-solid-state battery to the other electronic components electrically connected to the all-solid-state battery, and the electronic components may be damaged. As a general technique for cutting off a current flowing to an electronic component, a technique using PTC (Positive Temperature Coefficient) is described.

SUMMARY

The present application relates to a battery module, a method for manufacturing the battery module, an electronic device, and an electric vehicle.

The general technique described in the Background is not for cutting off an output of an all-solid-state battery to be solder-bonded. Therefore, when an all-solid-state battery is solder-bonded to a circuit board, a current from the all-solid-state battery flows to an electronic component, and the electronic component may be damaged.

In an embodiment, the present application relates to a battery module that can appropriately cut off an output of an all-solid-state battery to be solder-bonded, a method for manufacturing the battery module, an electronic device, and an electric vehicle.

The present application provides, in an embodiment, a battery module including: an all-solid-state battery having a voltage exceeding 0 V; a semiconductor element; a PTC element; and a circuit board, wherein the all-solid-state battery, the semiconductor element, and the PTC element are solder-bonded to the circuit board, the all-solid-state battery has a positive electrode terminal and a negative electrode terminal, the semiconductor element is electrically connected between the positive electrode terminal and the negative electrode terminal, and the PTC element is connected in series between the positive electrode terminal or the negative electrode terminal and the semiconductor element.

In addition, the present application provides, in an embodiment, a method for manufacturing a battery module in which an all-solid-state battery having a positive electrode terminal and a negative electrode terminal, a semiconductor element, and a PTC element are solder-bonded to a circuit board, the method including: electrically connecting the semiconductor element between the positive electrode terminal and the negative electrode terminal by the solder-bonding, connecting the PTC element in series between the positive electrode terminal or the negative electrode terminal and the semiconductor element by the solder-bonding, and tripping the PTC element before an atmospheric temperature during the solder-bonding reaches a junction temperature of the semiconductor element.

According to an embodiment, it is possible to appropriately cut off an output of an all-solid-state battery to be solder-bonded. Note that the contents of the present application are not to be construed as being limited by the effects exemplified in the present specification.

DETAILED DESCRIPTION

Hereinafter, the present application will be described below in further detail including with reference to the drawings and examples according to an embodiment, and where the contents of the present application are not limited thereto.

Figure 1:
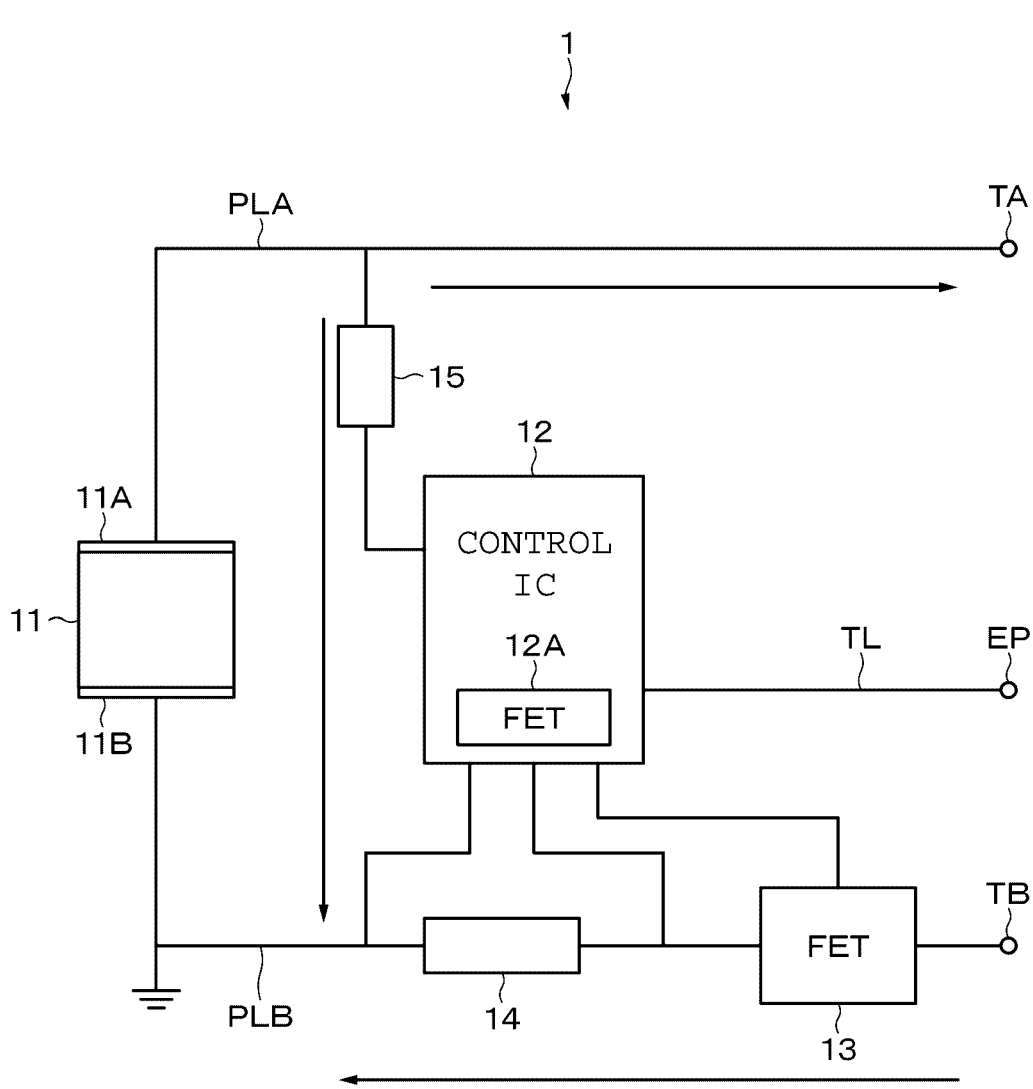
FIG. 1 is a diagram referred to in the description of problems to be considered.

First, in order to facilitate understanding of the present application, problems to be considered will be described with reference to FIG. 1. FIG. 1 is a diagram illustrating a configuration example of a common battery module (battery module 1). A battery module 1 includes an all-solid-state battery 11, a control integrated circuit (IC) 12 which is an example of a control unit, a field effect transistor (FET) 13 which is an example of a switch unit, a current detection resistor 14, and a resistor 15. The control IC 12 contains an FET 12A.

A power line PLA is connected to a positive electrode terminal 11A of the all-solid-state battery 11, and a positive electrode output terminal TA is led out via the power line PLA. In addition, a power line PLB is connected to a negative electrode terminal 11B of the all-solid-state battery 11, and a negative electrode output terminal TB is led out via the power line PLB. The control IC 12 is connected between the positive electrode terminal 11A and the negative electrode terminal 11B, to be specific, between the power line PLA and the power line PLB via the resistor 15. In addition, a trigger input path TL is connected to a predetermined port of the control IC 12, and an enabling pin EP is led out via the trigger input path TL.

The all-solid-state battery 11, the control IC 12, the FET 13, the current detection resistor 14, and the like described above are solder-bonded to a circuit board (not shown). For example, each component is solder-bonded to the circuit board by reflow. Since it is not preferable that the all-solid-state battery 11 is deeply discharged, the all-solid-state battery 11 is solder-bonded by reflow in a state in which the all-solid-state battery 11 has a voltage exceeding 0 V.

Here, the junction temperatures of the semiconductor components of the battery module 1, to be specific, the junction temperatures of the FET 12A contained in the control IC 12 and the FET 13, are generally about 150° C. to 175° C. On the other hand, in mounting by reflow, the temperature in the reflow furnace reaches about 250° C. That is, the temperature exceeds the junction temperatures of the semiconductor components. The junction temperature is the maximum temperature at which the semiconductor operates, and when the temperature becomes higher than the junction temperature, a large number of electron-hole pairs are generated in the semiconductor crystal and the state of the semiconductor components becomes unstable. A short-circuit state may occur in some cases.

When the temperature in the reflow furnace exceeds the junction temperature, the operation of the FET 12A of the control IC 12 and the FET 13 becomes unstable, and the FET 12A and the FET 13 may always be in a conductive state. When the FET 12A and the FET 13 are in a conductive state, as schematically illustrated by an arrow in FIG. 1, a short-circuit current flows from the all-solid-state battery 11 to the control IC 12, and the control IC 12 may fail without being able to limit the short-circuit current by the resistor 15. In addition, as schematically illustrated by the arrow in FIG. 1, the current flowing toward the outside of the battery module 1 may adversely affect electronic components other than the battery module 1 mounted on the circuit board. The present disclosure made in consideration of such a viewpoint will be described in further detail according to an embodiment.

Figure 2:
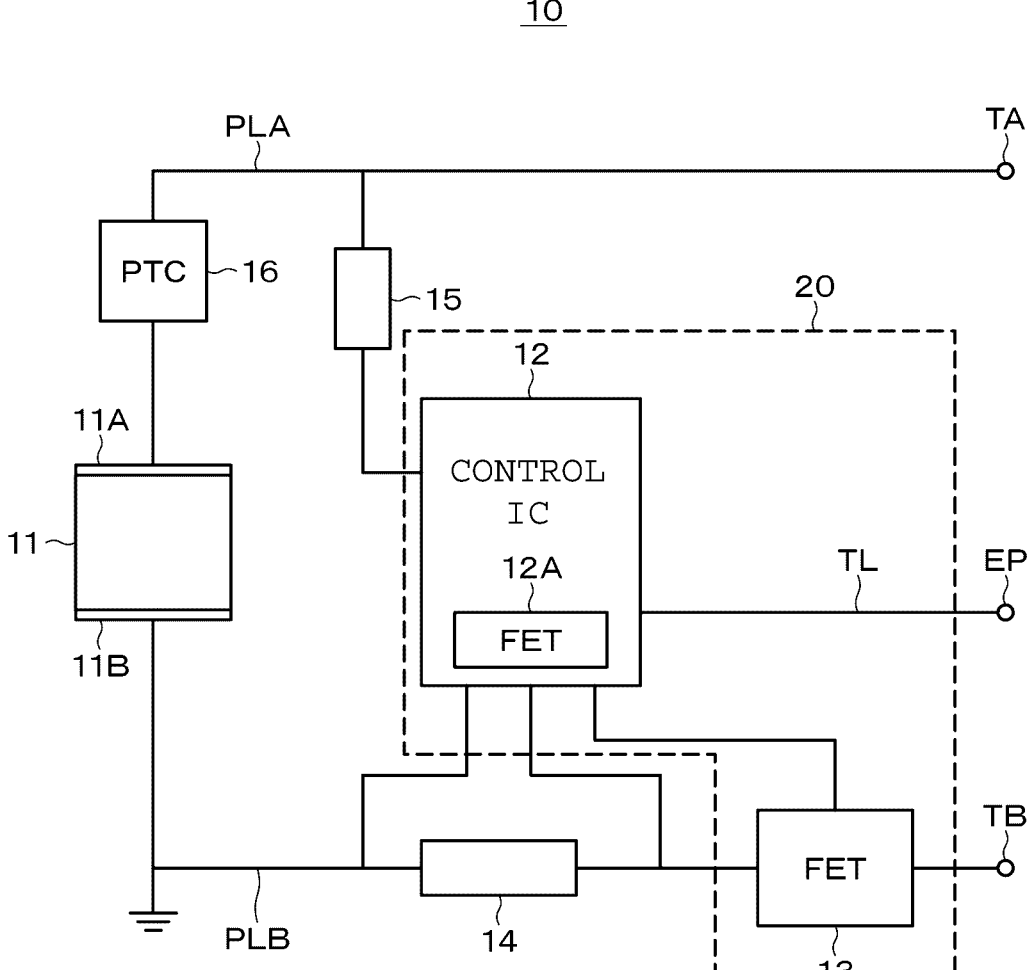
FIG. 2 is a diagram illustrating a configuration example of a battery module according to an embodiment of the present application.

FIG. 2 is a diagram illustrating a configuration example of a battery module (battery module 10) according to an embodiment. Note that the same configurations as those of the above-described battery module 1 are denoted by the same reference symbols, and redundant description regarding the configuration and connection mode is appropriately omitted.

The battery module 10 is structurally different from the battery module 1 in that the battery module 10 includes a PTC element 16. Hereinafter, the configuration of the battery module 10 will be described in further detail.

Examples of the all-solid-state battery 11 include metal ion all-solid-state batteries such as a lithium ion all-solid-state battery, a sodium ion all-solid-state battery, and a calcium ion all-solid-state battery. According to an embodiment, an all-solid-state battery that has a known structure or a known material can be applied as the all-solid-state battery 11. It is to be noted that the all-solid-state battery according to the present specification refers to a secondary battery including at least a solid electrolyte layer, and there is not necessarily a need for all of the configurations of the secondary battery to be solid.

The control IC 12 controls the battery module 10. The control IC 12 operates with electric power obtained by appropriately converting the electric power of the all-solid-state battery 11 as a power supply, for example. When the control IC 12 performs control, the built-in FET 12A is appropriately turned on/off. An example of control performed by the control IC 12 is a control in which the state of the all-solid-state battery 11 is monitored and a control signal for turning on/off the FET 13 is transmitted to the FET 13 in accordance with the state which is a result of the monitoring. For example, when the state of the all-solid-state battery 11 is overcharge or overdischarge, the control IC 12 transmits a control signal for turning off the FET 13, thereby preventing the all-solid-state battery 11 from being charged or discharged. When the current value detected through the current detection resistor 14 exceeds a threshold value, the control IC 12 transmits a control signal for turning off the FET 13 to cut off the circuit.

The FET 13 is a switching element having an on/off that is controlled by the control IC 12. The FET 13 is set to an off state so as to cut off the output of the all-solid-state battery 11 at the time of mounting the battery module 10.

Note that a configuration including a plurality of semiconductor components having semiconductors (for example, FET) is a semiconductor element. In an embodiment, the control IC 12 and the FET 13 constitute a semiconductor element 20. Note that the semiconductor components constituting the semiconductor element 20 are not necessarily packaged.

The current detection resistor 14 is a resistor for detecting a current value flowing through the current path of the battery module 10. For example, the control IC 12 detects the current value, based on the voltage value generated across both ends of the current detection resistor 14. It is to be noted that according to an embodiment, the current detection resistor 14 is connected to the power line PLB, but the current detection resistor 14 may also be connected to the power line PLA.

The resistor 15 is connected between the power line PLA and a predetermined port of the control IC 12. The current input to the control IC 12 is limited by the resistor 15.

The PTC element 16 is a type of heat sensitive resistance element, and is an element having a characteristic that the resistance of the PTC element 16 is low at relatively low temperatures, but the resistance increases sharply when a certain detection temperature is exceeded. The transition from a low resistance state to a high resistance state is referred to as "tripping", and the temperature at which tripping occurs is referred to as the "trip temperature" or the "Curie point (Curie temperature)". It should be noted that the resistance of the PTC element 16 also decreases when the temperature drops after the PTC element 16 trips once. As an example, while the resistance at room temperature (25° C.) is several $\Omega$ (ohm) to several tens of $\Omega$, the resistance after tripping is several hundred times (several hundred $\Omega$ to several M$\Omega$ (megaohm)). The trip temperature can be specified by a value described in the specification of the PTC element 16 or by measuring the temperature when the resistance changes.

The PTC element 16 is connected in series between the positive electrode terminal 11A or the negative electrode terminal 11B of the all-solid-state battery 11 and the semiconductor element 20. In an embodiment, the PTC element 16 is connected in series between the positive electrode terminal 11A of the all-solid-state battery 11 and the control IC 12 (see FIG. 2) and between the negative electrode terminal 11B of the all-solid-state battery 11 and the FET 13 (see FIG. 5).

Figure 3:
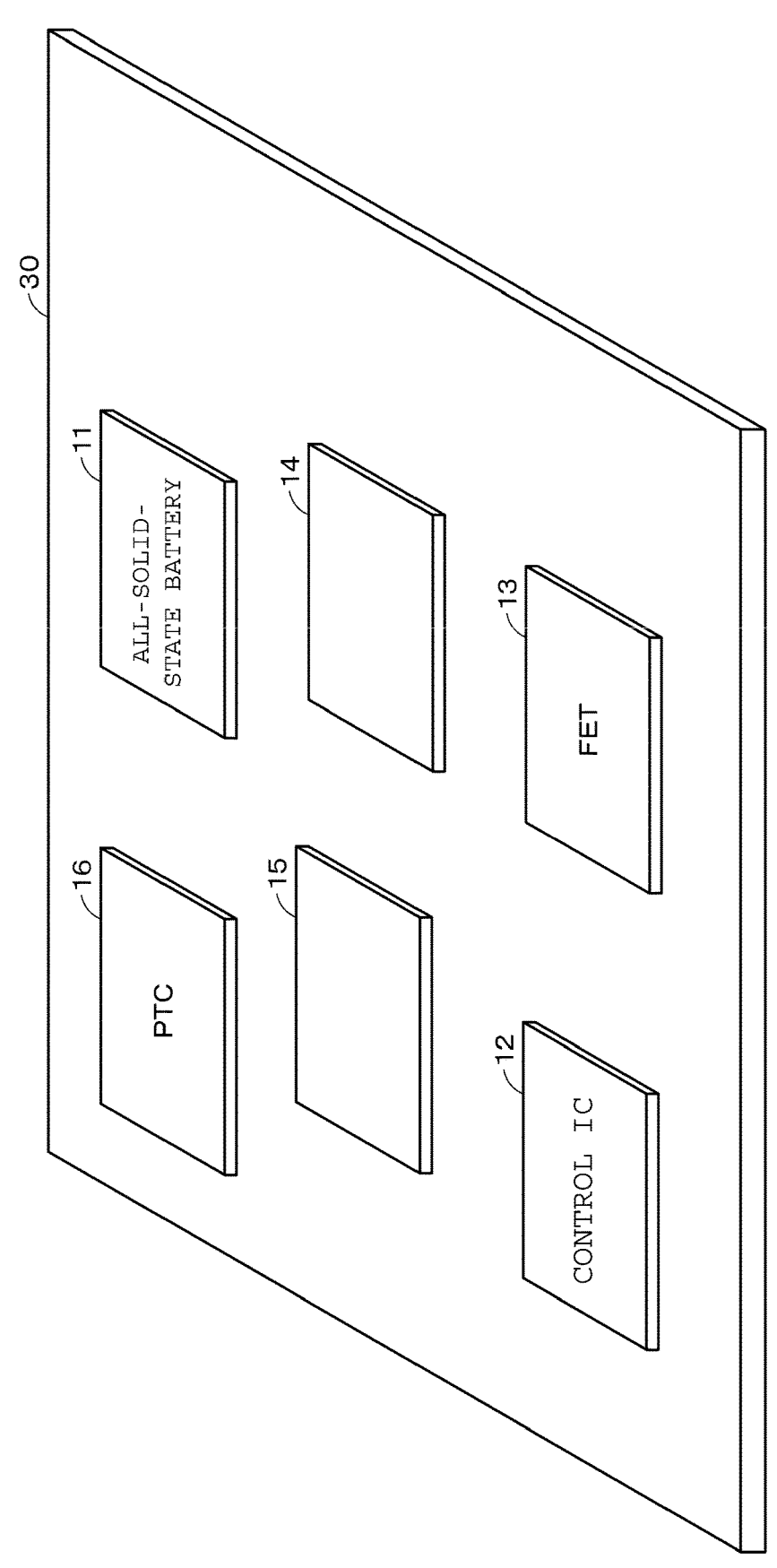
FIG. 3 is a diagram schematically illustrating a state in which electronic components constituting a battery module according to an embodiment of the present application are mounted on a circuit board.

In addition, the battery module 10 includes a circuit board 30. As schematically illustrated in FIG. 3, each configuration described above is solder-bonded to the circuit board 30. The circuit board 30 is, for example, a printed circuit board. The circuit board 30 may be a multilayer board or a built-up board.

Next, the trip temperature of the PTC element 16 will be described. When the configurations of the battery module 10 are mounted by reflow, once the temperature in the reflow furnace exceeds the junction temperature of the semiconductor element 20, the above-described disadvantage is caused. Therefore, in an embodiment, the current from the all-solid-state battery 11 is cut off by the PTC element 16 to avoid the above-described disadvantage. Note that "cutting off" refers to limiting to 0 or to a value that can be substantially regarded as 0.

Therefore, the battery module 10 according to an embodiment is configured such that the PTC element 16 trips before the semiconductor element 20 reaches the junction temperature. As a result, when the temperature in the reflow furnace becomes high and the operation of the control IC 12 or the FET 13 constituting the semiconductor element 20 becomes unstable, the PTC element 16 trips and the current is cut off, and thus, it is possible to prevent a short-circuit current from flowing to the control IC 12 or a current from flowing from the battery module 10 to the outside.

Specifically, a PTC element having a trip temperature lower than the junction temperature of the semiconductor element 20 is used as the PTC element 16. For example, the trip temperature of the PTC element 16 is higher than the operating temperature of the semiconductor element 20 and lower than the junction temperature of the semiconductor element 20. Note that the operating temperature of the semiconductor element 20 is lower than the junction temperature and is in a range in which the semiconductor normally operates, and is described in a specification or the like as, for example, a normal use temperature, an operation-guaranteed temperature, an operation ambient temperature, or a recommended temperature. When the control IC 12 and the FET 13 constituting the semiconductor element 20 have different junction temperatures, the PTC element 16 having a trip temperature lower than the lower junction temperature is used.

Here, when the trip temperature is extremely lower than the junction temperature of the semiconductor element 20, the output of the all-solid-state battery 11 is cut off by the PTC element 16 despite the normal operation of the semiconductor element 20. Therefore, it is preferable that the PTC element 16 has a trip temperature within a range of 50° C. below the junction temperature of the semiconductor element 20. Since the junction temperature of the semiconductor element 20 is approximately 150° C. to 175° C., for example, a PTC element having a trip temperature of 90° C. or higher and 140° C. or lower is used as the PTC element 16.

An operation example of the battery module 10 when the battery module 10 having the above-described configuration is reflow-mounted on a circuit board will be described with reference to an example of a temperature profile during reflow illustrated in FIG. 4. In the temperature profile illustrated in FIG. 4, the horizontal axis represents time and the vertical axis represents the temperature in the reflow furnace. The first section is a temperature raising section R1 in which the temperature is raised by heating, the next section is a preheating section R2 in which the temperature is substantially constant, the next section is a main heating section R3, and the last section is a cooling section R4.

The temperature raising section R1 is a period in which the circuit board is heated from room temperature to the preheating section R2 (for example, 150° C. to 170° C.). The preheating section R2 is a period for performing isothermal heating, activating the flux, removing oxide films on the surfaces of the electrodes and solder powder, and eliminating uneven heating of the circuit board. The main heating section R3 (for example, at a peak temperature of 240° C. to 270° C.) is a period in which the solder is melted and bonding is completed. In the main heating section R3, it is necessary to increase the temperature to a temperature exceeding the melting temperature of the solder. The main heating section R3 needs to be heated to a temperature exceeding the melting temperature of the solder because there is unevenness in the temperature increase after passing through the preheating section R2. The last cooling section R4 is a period in which the circuit board is rapidly cooled to form a solder composition.

Figure 4:
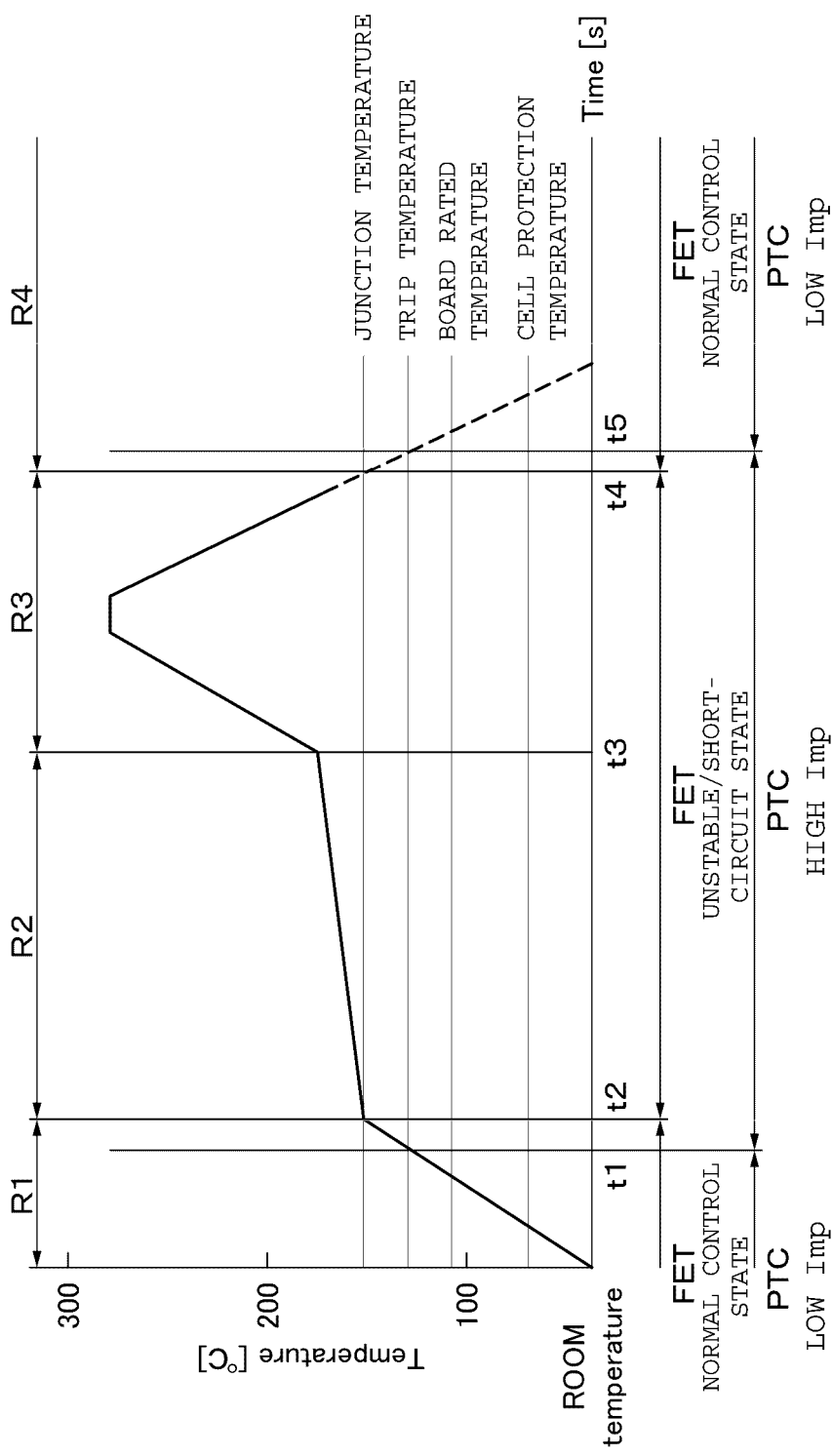
FIG. 4 is a diagram illustrating an example of a reflow temperature profile, which is referred to in a description of an operation example of a battery module according to an embodiment of the present application.

FIG. 4 also illustrates the junction temperature, the trip temperature of the PTC element 16, the board rated temperature, and the cell protection temperature. The junction temperature is a junction temperature of the semiconductor element 20. In this example, the junction temperatures of the control IC 12 and the FET 13 are the same, and specifically assumed to be 150° C. In this example, the trip temperature of the PTC element 16 is assumed to be 130° C. The board rated temperature is the maximum temperature in the use temperature range of the circuit board 30 on which the battery module 10 is mounted, and is approximately 105 to 120° C. In this example, the board rated temperature is assumed to be 105° C. The cell protection temperature is a protection temperature of the lithium ion secondary battery, and is assumed to be 80° C. in this example.

Note that a process of charging the all-solid-state battery 11 of 0 V (hereinafter, appropriately referred to as initial charging) is performed as a process of making the all-solid-state battery 11 usable as a battery, that is, a process of activating the all-solid-state battery 11, before the battery module 10 is mounted on the circuit board 30 by reflow or the like. The initial charging is performed by, for example, connecting a charging device to the positive electrode terminal 11A and the negative electrode terminal 11B of the all-solid-state battery 11 using a manufacturing device or the like. By the initial charging, the all-solid-state battery 11 has a voltage exceeding 0 V. Because the all-solid-state battery 11 is charged, the control IC 12 is in an operable state (active state). In the initial state, the semiconductor element 20, to be specific, the FET 12A of the control IC 12 and the FET 13, is switched off.

Until the temperature in the reflow furnace exceeds the trip temperature, i.e., during the period until the t1 in FIG. 3, the semiconductor element 20 operates normally and the PTC element 16 is in a low resistance state. When the temperature in the reflow furnace exceeds the trip temperature of the PTC element 16 at the timing of the t1, the PTC element 16 trips and enters a high resistance state. Since the PTC element 16 has transitioned to the high resistance state, the current from the all-solid-state battery 11 is cut off.

At the subsequent timing t2, the temperature in the reflow furnace may exceed the junction temperature, and the operation of the semiconductor element 20 may become unstable and a short-circuit state may occur. However, at the stage of the timing t2, the PTC element 16 operates and the current from the all-solid-state battery 11 is cut off, and thus, the short-circuit current does not flow through the control IC 12.

From the timing t3 to the timing t4 is the main heating section R3. After completion of the main heating, the temperature in the reflow furnace is lowered by a cooling treatment. At the timing t4, the temperature in the reflow furnace becomes lower than the junction temperature. As a result, the short-circuit state of the FET 12A included in the control IC 12 and the FET 13 is eliminated, and a high-impedance state is obtained. At the timing t5, the temperature in the reflow furnace becomes lower than the trip temperature. As a result, the PTC element 16 transitions from the high resistance state to the low resistance state. When the process in the cooling section R4 is completed, the battery module 10 is reflow-mounted on the circuit board 30.

In addition, a process of turning the FET 13 from the off state to the on state is performed at an appropriate timing (for example, timing of board inspection) after the reflow such that the battery module 10 is allowed to be used. The control IC 12 causes the FET 13 to transition from the off state to the on state in response to the input of a trigger for causing the FET 13 to transition to the on state. As a result, the output from the all-solid-state battery 11 can be supplied to the outside (load).

The trigger is, for example, a high-level or low-level signal, and is applied to the battery module 10 from the outside of the battery module 10. The trigger is input to the control IC 12 via, for example, an enabling pin EP and a trigger input path TL. For example, the control IC 12 detects a change in a logical level in the input to its own port to which the trigger input path TL is connected, thereby recognizing the input of the trigger. The control IC 12 that has detected the input of the trigger signal causes the FET 13 in the off state to transition to the on state.

The battery module 10 is manufactured, for example, as follows.

Electronic components such as the all-solid-state battery 11, the semiconductor element 20, and the PTC element 16 are arranged on the mounting surface of the circuit board 30. These electronic components are solder-bonded to the mounting surface of the circuit board 30 by reflow. To be specific, by solder-bonding, the semiconductor element 20 is electrically connected between the positive electrode terminal 11A and the negative electrode terminal 11B of the all-solid-state battery 11, and the PTC element 16 is connected in series between the positive electrode terminal 11A and the semiconductor element 20.

Before the atmospheric temperature (ambient temperature, also referred to as environmental temperature, etc., and in this example, the temperature in the reflow furnace corresponds) during solder-bonding reaches the junction temperature of the semiconductor element 20, the PTC element 16 trips, causing the PTC element 16 to transition from the low resistance state to the high resistance state. This can be achieved by using the PTC element 16 whose trip temperature is lower than the junction temperature of the semiconductor element 20. After the PTC element 16 operates, the atmospheric temperature reaches the junction temperature of the semiconductor element 20.

Then, main heating for reflow-mounting is performed to melt the solder. Thereafter, in a cooling step, the electronic components constituting the battery module 10 are mounted on the circuit board 30 to complete the battery module 10. In accordance with the progress of the cooling step, the atmospheric temperature becomes lower than the junction temperature of the semiconductor element 20, the short-circuit state of the semiconductor element 20 is eliminated, and a high-impedance state is obtained. When the atmospheric temperature further decreases and becomes lower than the trip temperature, the PTC element 16 enters the low resistance state, and the electric power of the all-solid-state battery 11 can be supplied to the outside.

According to the present application described herein, for example, the following effects can be obtained in an embodiment.

It is possible to cut off a current in a closed circuit which may be formed at the time of solder-bonding (specifically, at the time of reflow). As a result, since it is possible to prevent a short-circuit current from flowing through the control IC 12, it is possible to prevent the control IC 12 from failing, and it is possible to improve security. In addition, it is possible to prevent electronic components other than the battery module 10 mounted on the circuit board 30 from being adversely affected by the current flowing to the outside of the battery module 10. In addition, by cutting off the current with the PTC element 16, it is possible to prevent a large current from flowing through the circuit board 30 during reflow-mounting and the circuit board 30 from generating abnormal heat. The conventional configuration cannot prevent the current from flowing to the outside, and cannot prevent the current from flowing to a smart circuit.

In an embodiment, since the PTC element is configured to trip before the atmospheric temperature exceeds the junction temperature of the semiconductor component, it is possible to cut off the flowing current when the atmospheric temperature exceeds the junction temperature of the semiconductor component.

Since the reflow-mounting can be performed in a state where the all-solid-state battery 11 has a voltage exceeding 0 V, it is not necessary to deeply discharge the all-solid-state battery 11 to 0 V or substantially 0 V, and it is possible to prevent deterioration of the all-solid-state battery 11. In addition, after mounting the battery module 10, the electric power of the all-solid-state battery 11 can be reliably output to the outside.

Although an embodiment of the present application has been described herein, the content of the present application is not limited thereto, and various modifications based on a technical idea of the present application are contemplated.

Figure 5:
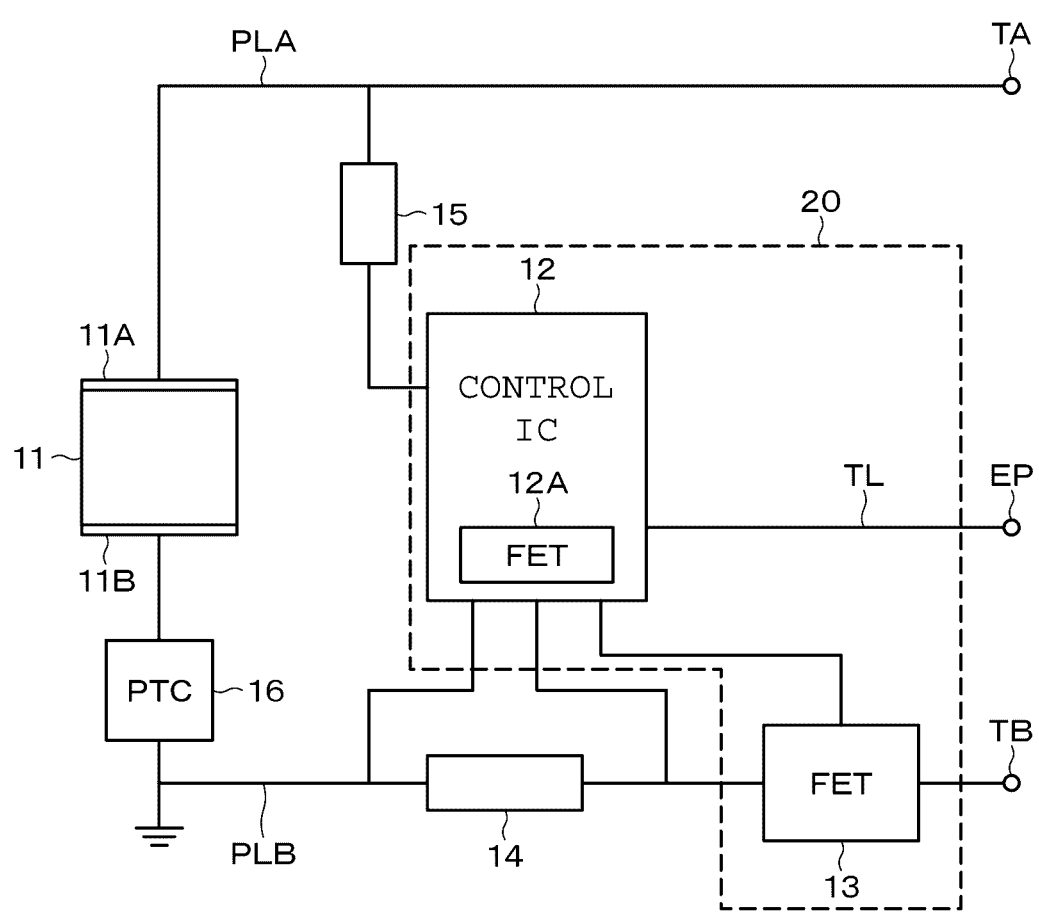
FIG. 5 is a diagram for describing a modified example.

As illustrated in FIG. 5, the PTC element 16 may be connected to the power line PLB. That is, the PTC element 16 may be connected in series between the negative electrode terminal 11B and the semiconductor element 20.

The circuit board 30 according to an embodiment may be a board having a plurality of mounting surfaces, and specifically, may be a double-sided board. After a predetermined electronic component is reflow-mounted on one mounting surface, the circuit board may be reversed and another electronic component may be reflow-mounted on the other mounting surface. The electronic components reflow-mounted on the respective mounting surfaces are electrically connected by through-hole connection or the like. However, in this case, since the atmospheric temperature of each mounting surface differs depending on the order of reflow-mounting, it is necessary to consider the electronic components to be reflow-mounted. For example, consider an example in which an all-solid-state battery and a PTC element are reflow-mounted on one mounting surface, and then a semiconductor element is reflow-mounted on the other mounting surface. When the atmospheric temperature exceeds the junction temperature of the semiconductor element during the reflow-mounting of the semiconductor element, the operation of the semiconductor element becomes unstable. At this time, since the PTC element is disposed on the mounting surface on the opposite side, there is a possibility that the PTC element does not operate due to low atmospheric temperature. In order to avoid such disadvantage, it is preferable that the PTC element and the semiconductor element are solder-bonded to the same mounting surface and the all-solid-state battery is solder-bonded to another mounting surface. As a result, since the atmospheric temperatures for both are substantially the same, the operation described in one embodiment can be reliably performed.

In an embodiment, the control IC 12 may transmit the state of the all-solid-state battery 11 and the current value detected via the current detection resistor 14 to an upper-level protection IC, and the protection IC may perform a protection operation of the battery module 10.

The battery applied to the present application is preferably an all-solid-state battery having high heat resistance, but other batteries may be applied as long as they can be reflow-mounted. The number, type, and application of the semiconductor components are not limited to those described in an embodiment, and for example, a transistor or an IGBT (Insulated Gate Bipolar Transistor) may be used instead of the FET. Instead of the PTC element, an element having characteristics similar to those of the PTC element may be used. In addition, the semiconductor element may be configured by one semiconductor component (for example, one FET).

The matters described herein according to an embodiment including modified examples can be appropriately combined. In addition, the materials, processes, and the like described herein according to an embodiment are merely examples, and the contents of the present application are not limited to the exemplified materials and the like.

The battery module according to the present application can be used for mounting on various electronic devices, an electric vehicle, or the like, or for supplying electric power thereto.

Next, a specific application example will be described. For example, the above-described battery module can be used as a power supply for a wearable device that has the function of a portable information terminal, that is, a so-called wearable terminal. Examples of the wearable terminal include a wristwatch-type terminal and a glasses-type terminal, and are not limited thereto.

Figure 6:
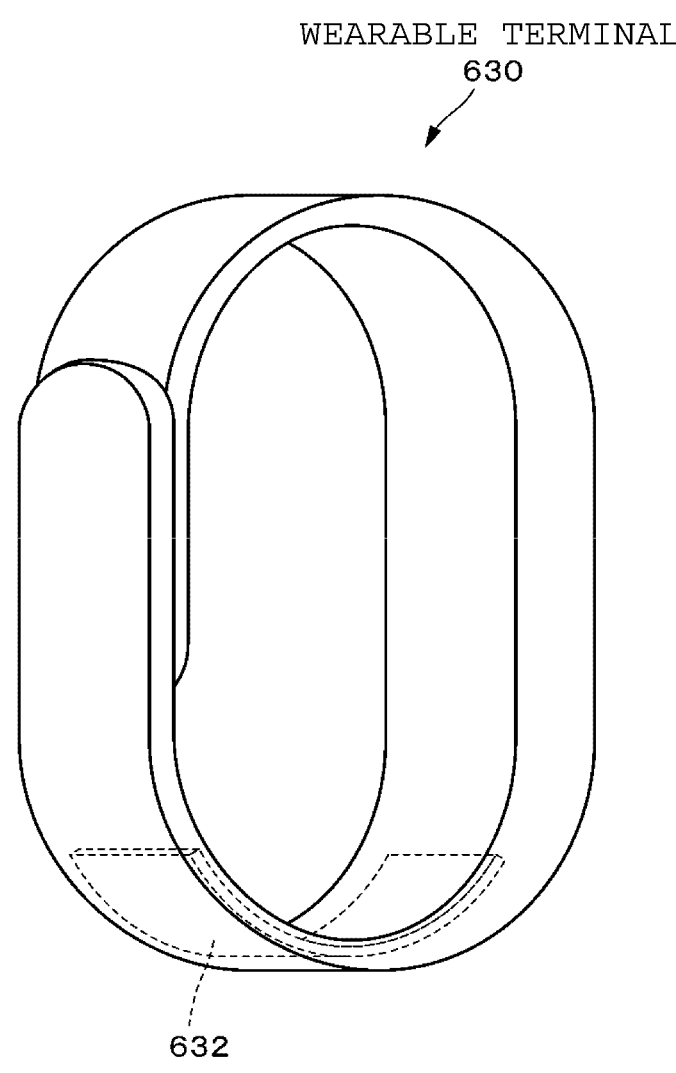
FIG. 6 is a diagram for describing an application example.

FIG. 6 illustrates an example of a wearable terminal that has a built-in battery module. As illustrated in FIG. 6, a wearable terminal 630 according to the application example is a wristwatch-type terminal, which includes therein a battery pack 632. The battery module according to the present application can be applied as the battery pack 632. The wearable terminal 630 can be worn and used by a user. The wearable terminal 630 may be a deformable flexible terminal.

Figure 7:
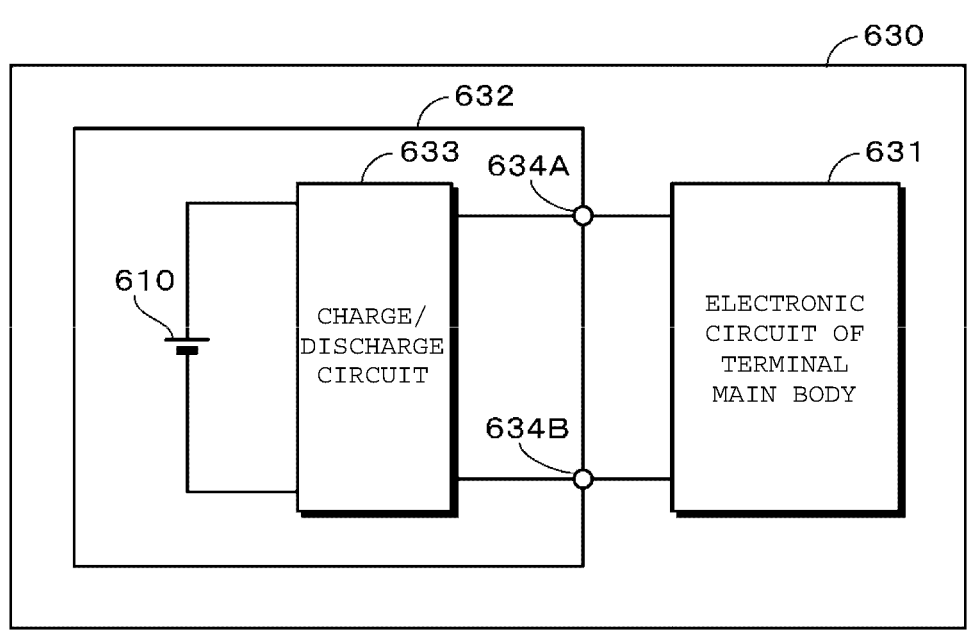
FIG. 7 is a diagram for describing an application example.

As illustrated in FIG. 7, the wearable terminal 630 according to the application example includes an electronic circuit 631 of an electronic device main body, and the battery pack 632. The battery pack 632 is electrically connected to the electronic circuit 631. The wearable terminal 630 has, for example, a configuration that allows the user to freely attach and detach the battery pack 632. The configuration of the wearable terminal 630 is not limited to this example, and the battery pack 632 may be incorporated in the wearable terminal 630 such that the user cannot remove the battery pack 632 from the wearable terminal 630.

During charging of the battery pack 632, a positive electrode terminal 634A and a negative electrode terminal 634B of the battery pack 632 are connected to a positive electrode terminal and a negative electrode terminal of a charger (not shown), respectively. On the other hand, during discharging of the battery pack 632 (during use of the wearable terminal 630), the positive electrode terminal 634A and the negative electrode terminal 634B of the battery pack 632 are connected to a positive electrode terminal and a negative electrode terminal of the electronic circuit 631, respectively.

The electronic circuit 631 includes, for example, a CPU, a peripheral logic unit, an interface unit, a storage unit, and the like, and controls the whole of the wearable terminal 630.

The battery pack 632 includes an all-solid-state battery cell 610 (the all-solid-state battery 11 in an embodiment) and a charge/discharge circuit 633.

While an example in which the battery module according to the present application is applied as the battery pack 632 has been described in the present application example, the battery module according to the present application may be mounted on the electronic circuit 631 of the electronic device main body.

Figure 8:
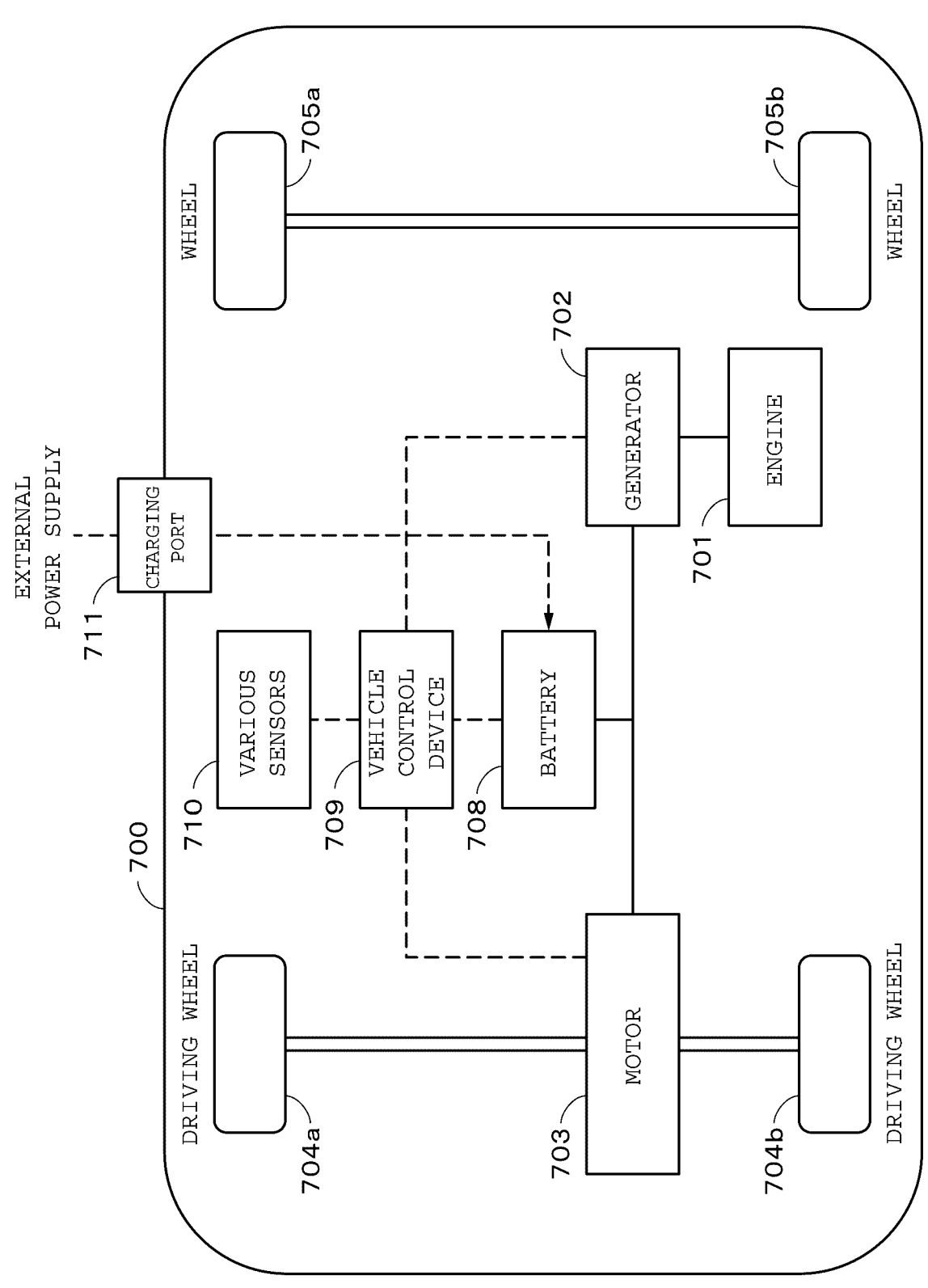
FIG. 8 is a diagram for describing an application example.

Another application example will be described. As another application example in which the present application is applied to an electric vehicle power storage system, FIG. 8 schematically illustrates a configuration example of a hybrid vehicle (HV) employing a series hybrid system. The series hybrid system is a car travelling with an electric power driving force converter using electric power generated by a generator powered by an engine or electric power obtained by temporarily storing the generated electric power in a battery.

A hybrid vehicle 700 is mounted with an engine 701, a generator 702, the electric power driving force converter (direct-current motor or alternate-current motor; hereinafter, referred to simply as a "motor 703"), a driving wheel 704a, a driving wheel 704b, a wheel 705a, a wheel 705b, a battery 708, a vehicle control device 709, various sensors 710, and a charging port 711. As the battery 708, the battery module of the present application can be applied.

The motor 703 is operated by the electric power of the battery 708, and a rotational force of the motor 703 is transmitted to the driving wheels 704a and 704b. The battery 708 can store the electric power generated at the generator 702 by the rotational force produced by the engine 701. The various sensors 710 control an engine speed using the vehicle control device 709, or control an opening degree of a throttle valve which is not shown.

When the hybrid vehicle 700 is decelerated by a brake mechanism which is not shown, a resistance force during the deceleration is applied as a rotational force to the motor 703, and regenerative electric power generated due to this rotational force is stored in the battery 708. In addition, the battery 708 can be charged by being connected to an external power supply via the charging port 711 of the hybrid vehicle 700. Such an HV vehicle is referred to as a plug-in hybrid vehicle (PHV or PHEV).

The battery module according to the present application can also be applied to a downsized primary battery and used as a power supply of a tire pressure monitoring system (TPMS) built in wheels 704 and 705.

Although a series hybrid vehicle has been described above as an example, the present application is not limited thereto. For example, the present application is also applicable to a hybrid vehicle of a parallel system using an engine and a motor together or a hybrid vehicle in which a series system and a parallel system are combined. In addition, the present application is also applicable to an electric vehicle (EV or BEV) and a fuel cell vehicle (FCV) that travel only by a drive motor without using an engine. In addition, the present application is also applicable to an electric bicycle.

DESCRIPTION OF REFERENCE SYMBOLS

10: Battery module
11: All-solid-state battery

11A: Positive electrode terminal
11B: Negative electrode terminal
12: Control IC
12A: FET
13: FET
16: PTC element
20: Semiconductor element It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery module comprising:
an all-solid-state battery having a voltage exceeding 0 V;
a semiconductor element;
a PTC element; and
a circuit board,
wherein
the all-solid-state battery, the semiconductor element, and the PTC element are solder-bonded to the circuit board,
the all-solid-state battery has a positive electrode terminal and a negative electrode terminal,
the semiconductor element is electrically connected between the positive electrode terminal and the negative electrode terminal, and
the PTC element is connected in series between the positive electrode terminal or the negative electrode terminal and the semiconductor element,
wherein the PTC element is configured to trip before the semiconductor element reaches a junction temperature,
wherein a trip temperature of the PTC element is a temperature set within a range of 50° C. below the junction temperature of the semiconductor element, and
wherein the trip temperature of the PTC element is 90° C. or more and 140° C. or less.

2. The battery module according to claim 1, wherein
the semiconductor element includes a control unit and a switch unit, and
the control unit monitors a state of the all-solid-state battery and transmits a control signal to the switch unit in accordance with the state.

3. The battery module according to claim 1, wherein a trip temperature of the PTC element is higher than an operating temperature of the semiconductor element and lower than the junction temperature of the semiconductor element.

4. The battery module according to claim 1, wherein
the circuit board has a plurality of mounting surfaces on which an electronic component is mounted,
the PTC element and the semiconductor element are solder-bonded to a same mounting surface, and
the all-solid-state battery is solder-bonded to another mounting surface.

5. A method for manufacturing a battery module in which an all-solid-state battery having a positive electrode terminal and a negative electrode terminal, a semiconductor element, and a PTC element are solder-bonded to a circuit board, the method comprising:
electrically connecting the semiconductor element between the positive electrode terminal and the negative electrode terminal by the solder-bonding,
connecting the PTC element in series between the positive electrode terminal or the negative electrode terminal and the semiconductor element by the solder-bonding, and
tripping the PTC element before an atmospheric temperature during the solder-bonding reaches a junction temperature of the semiconductor element,
wherein the PTC element is configured to trip before the semiconductor element reaches a junction temperature,
wherein a trip temperature of the PTC element is a temperature set within a range of 50° C. below the junction temperature of the semiconductor element, and
wherein the trip temperature of the PTC element is 90° C. or more and 140° C. or less.

6. An electronic device comprising the battery module according to claim 1.

7. An electric vehicle comprising the battery module according to claim 1.

8. The battery module according to claim 1, wherein the all-solid-state battery, the semiconductor element, and the PTC element are solder-bonded to the circuit board with a solder that has a melting point higher than the junction temperature of the semiconductor element.

* * * * *